United States Patent [19]

Snape et al.

[11] 4,271,858
[45] Jun. 9, 1981

[54] BUTTERFLY VALVE HAVING TEMPERATURE RESPONSIVE SEALING MEANS

[75] Inventors: Christopher J. Snape, Halesowen; Philip J. Burton, Birmingham, both of England

[73] Assignee: Charles Winn (Valves) Limited, London, England

[21] Appl. No.: 958,889

[22] Filed: Nov. 8, 1978

[51] Int. Cl.³ ............................................. F16K 17/00
[52] U.S. Cl. ....................................... 137/74; 251/306
[58] Field of Search .................................... 137/72–77; 251/173, 306, 307, 308

[56] References Cited

U.S. PATENT DOCUMENTS

| 3,174,495 | 3/1965 | Anderson et al. | 137/74 |
| 3,591,133 | 7/1971 | Miles et al. | 251/173 |
| 3,815,869 | 6/1974 | Smith et al. | 251/306 |

Primary Examiner—Martin P. Schwadron
Assistant Examiner—H. Jay Spiegel
Attorney, Agent, or Firm—Scrivener, Clarke, Scrivener and Johnson

[57] ABSTRACT

In a butterfly valve, comprising a valve disk which is pivotally mounted in a valve housing for movement between a closed position, in which it prevents the flow of fluid along a passageway defined by the housing, and an open position in which the flow of fluid is allowed, an annular seal is provided to seal between the periphery of the disk and the wall of the passageway when the disk is in its closed position. The seal comprises two deformable sealing members of P.C.T.F.E. with a rigid fireproof ring independently mounted between the sealing elements. The disk is located for pivotal movement by locating means constituted by fire-destructible members of a similar material to that of the sealing elements, so that in the event of a fire that destroys the sealing elements the disk becomes free to move a small distance along the passageway into engagement with the fireproof ring to effect a seal. The disk is mounted on two axially aligned shafts which are keyed together to allow radial relative movement therebetween, but normally prevented from such movement by the locating means. A first of the two shafts, to which the valve disk is secured, is radially located for rotation in a blind bore in the housing by a fire-destructible bearing sleeve. The second shaft is rotatably mounted in the housing and extends from the housing for actuation of the valve. In the event of a fire, the fire-destructible collar and sleeve would be destroyed, leaving the disk free to move, with the first shaft, radially of the second shaft into sealing engagement with the fireproof ring.

1 Claim, 3 Drawing Figures

BUTTERFLY VALVE HAVING TEMPERATURE RESPONSIVE SEALING MEANS

BACKGROUND OF THE INVENTION

For some applications, for example for uses in the petrochemical industry, there is a requirement that a rotary valve can in the event of a fire still be closed to prevent flow along a pipeline. In rotary valves it is known to use seals of materials, such as materials based upon polytetrafluoroethylene (P.T.F.E.), which may be destroyed in the event of a serious fire, and provision must accordingly be made for a fireproof back-up seal which would survive a fire of the expected intensity.

Such valves are known as 'fire-safe valves' and meet well known standards such as British Standard No. 5146.

There has been proposed in U.K. patent specification No. 1 264 686 a butterfly valve in which the valve disk is mounted for pivotal movement on a shaft of which opposite end portions are rotatably mounted in fire-destructible bearings in the valve housing. The valve comprises an annular seal, which seals between the periphery of the disk and the wall of the passageway when the valve disk is in a closed position, comprising a deformable sealing element of P.T.F.E. and a rigid fireproof ring. There is a clearance between the shaft on which the disk is mounted and the valve housing so that in the event of a fire, which destroys both the sealing element and the bearings supporting the shaft in the housing, the shaft is free to move radially for movement of the disk along the passageway into sealing engagement with the fireproof ring. The disk is moved into engagement with the ring by fluid pressure within the passageway.

One end portion of the shaft is mounted in a blind bore in the housing, but the opposite end portion extends out of the housing to provide means for actuation of the valve. In order that fluid should not escape from the passageway through the clearance between said opposite end portion of the shaft and the housing when the bearing sleeves are destroyed, a deformable, fireproof, seal is provided in the clearance. However, this seal has the adverse effect of restricting the radial movement of the shaft in the clearance, and will tend to cause a pivotal movement of the shaft about the seal. As a consequence of such pivotal movement, the valve disk may not make adequate sealing engagement with the fireproof ring and the valve may not be fully closed. Furthermore, owing to the distortion of the seal around the shaft, when the shaft moves upon destruction of the bearings, the seal may no longer be fully effective and may allow the escape of fluid from the passageway.

SUMMARY OF THE INVENTION

It is an object of this invention to provide an improved rotary valve in which the valve member is located for pivotal movement by fire-destructible locating means, so that in the event of a fire which destroys the valve seal the locating means is also destroyed and the member can move into sealing engagement with a fire proof ring.

In accordance with the invention a rotary valve comprises a valve housing defining a passageway through which fluid is to pass, a valve member pivotally mounted in the housing for movement between a closed position, in which it prevents the flow of fluid along the passageway, and an open position in which the flow of fluid is allowed, and an annular seal mounted on the valve housing to seal between a peripheral surface of the valve member and a wall of the passageway when the valve member is in its closed position, the seal comprising a primary sealing element and a fireproof ring, and the valve comprising first and second axially aligned shafts, the first shaft pivotally connecting the valve member to the housing, and the second shaft being mounted for rotation in the housing, connecting means for transmitting rotation of the second shaft to the valve member but permitting movement of the valve member radially of the second shaft, and fire-destructible locating means which prevents said radial relative movement and comprises a fire-destructible bearing sleeve located on the first shaft whereby in the event of a fire that destroys the primary sealing element the bearing sleeve would also be destroyed and the valve member would become free to move relative to its normal pivotal axis and axially of the passageway into sealing engagement with the fireproof ring.

Preferably the connecting means comprises a keyed engagement between adjacent ends of the shaft, the first shaft being secured to the valve member.

There now follows a detailed description, to be read with reference to the accompanying drawings, of two embodiments of the invention which are described by way of example:

Figure 1:
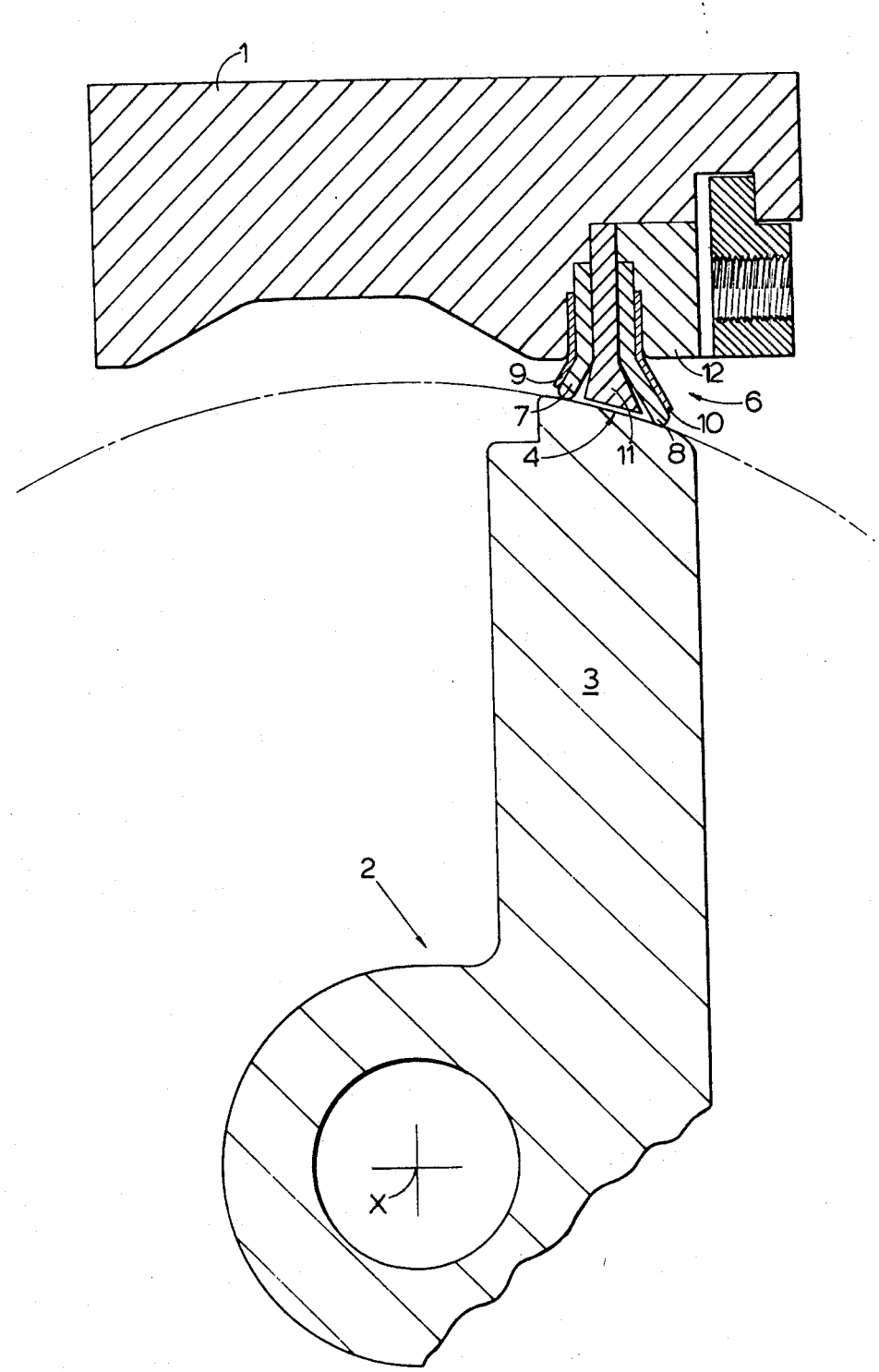
FIG. 1 is a cross-sectional partial view of a butterfly valve for cryogenic use with the valve disk shown in the closed position.
Figure 2:
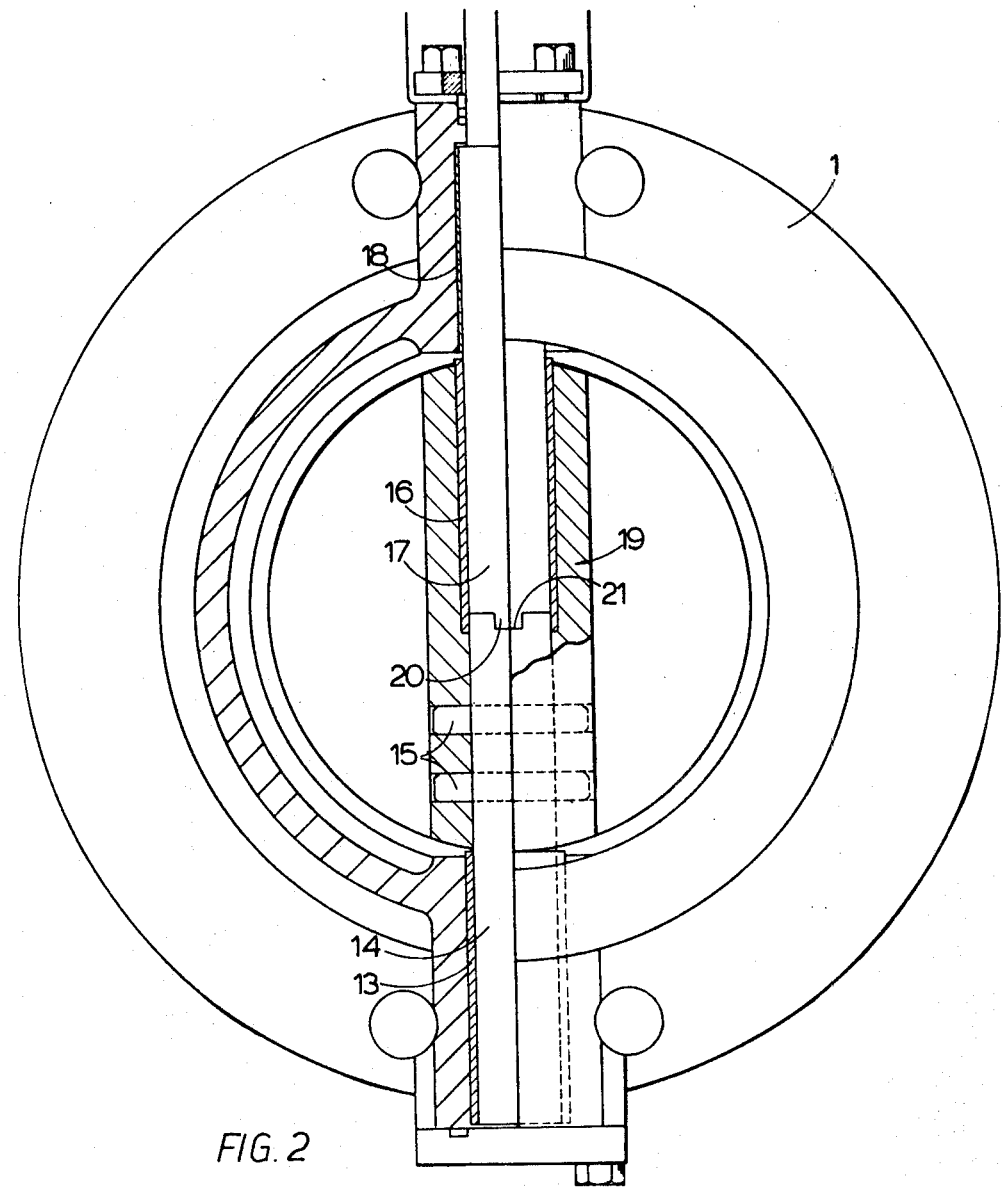
FIG. 2 shows the mounting of the disk of the valve.

The valve of FIGS. 1 and 2 comprises a valve housing 1 defining a passageway through which fluid is to pass. Only part of the valve housing 1 is shown in FIG. 1 of the drawings. A valve member 2 provides a circular valve disk 3 which is pivotally mounted within the housing for movement between a closed position in which it prevents the flow of fluid along the passageway, and an open position in which the flow of fluid is allowed. The disk 3 is displaced from the pivotal axis X of the valve member. The periphery 4 of the disk 3 is defined, as in usual, by an annular portion of a sphere about the midpoint of the axis X. The housing 1 is formed with an annular recess provided with a plurality of steps and in which is clamped an annular seal assembly 6 comprising primary sealing members in the form of first and second annular sealing elements 7 and 8 respectively, first and second resilient annular metal bands 9 and 10 respectively, and a back-up sealing member in the form of a fireproof, rigid metal, supporting ring 11. The annular seal assembly 6 is so mounted on the valve housing to seal between the periphery 4 of the valve disk and a wall of the passageway when the disk is in its closed position. The seals 7 and 8 are moulded from poly chloro trifluoro ethylene (P.C.T.F.E.). Alternatively poly tetrafluoro ethylene (P.T.F.E.) may be used for the seals.

The seal assembly is clamped in the recess in the housing by a clamping ring 12 of L-shape in cross-section which is retained in place by a series of circumferentially spaced clamping screws (not shown). An outer peripheral portion of the support ring extends radially beyond the two sealing elements 7 and 8, and is clamped, independently of the two sealing elements, between the clamping ring 12 and the housing.

The disk 3 is located for pivotal movement by fire-destrucible locating means, comprising members of P.T.F.E. (polytetrafluoroethylene) so that in the event of a fire the valve disk is able to move axially along the passageway to seat against the support ring 11. Since the support ring remains firmly clamped even when the sealing elements 7 and 8 are destroyed the valve is still effective substantially to prevent fluid flow.

As shown in FIG. 2, a bearing sleeve 13 of the locating means radially locates a first shaft 14 in a blind bore in the valve housing 1 for rotation about the pivot axis X. The disk 3 is mounted on the shaft 14 and secured to the shaft, by two dowel pins 15, for rotation with the shaft for movement between its open and closed positions. A collar 16 of the locating means helps to maintain the first shaft in axial alignment with a second shaft 17. The second shaft 17 is rotatably mounted in the valve housing 1, for rotation about the pivot axis, by means of a substantially fireproof sleeve 18; the sleeve 18 may be, for example, of sintered bronze impregnated with P.T.F.E.. The second shaft 17 is a valve actuating shaft by which, in use of the valve, the valve disk can be moved between its open and closed positions. The shaft 17 extends from the housing for actuation of the valve, and fireproof means, comprising the sleeve 18, seals between the shaft 17 and the housing to prevent the escape therebetween of fluid from the passageway. The bearing sleeve 13 and the sleeve 18 are mounted in the housing at positions which are generally at opposite ends of a diameter of the disk 3. The first and second shafts are connected for rotation together by connecting means in the form of a keyed connection 19. The connection 19 comprises a tongue 20 on the end of the second shaft 17 which is engaged in a groove 21 in the end of the first shaft 14 for sliding movement therein, thus the connecting means would allow radial relative movement between the shafts but for the locating means which prevents such movement.

The disk 3 is mounted on the second shaft 17 and is radially located on the shaft 17 by the collar 16, the keyed connection 19 being adjacent the centre of the disk 3, as seen in FIG. 2. The collar 16 extends around end portions of the first and second shafts adjacent the keyed connection, as seen in FIG. 2.

The bearing sleeve 13 and the collar 16 are both of fire-destructible materials such that they would be destroyed in any fire which destroyed the primary sealing elements 7 and 8. Upon destruction of the sleeve 13 and the collar 16, the keyed connection 19 permits the shaft 14, with the disk 3, to be moved, by the fluid pressure in the passageway, radially of the shaft 17 and the pivot axis X, so that the disk is moved axially of the passageway into engagement with the supporting ring 11. In this way a seal can be reliably achieved in the event of a fire which destroys the primary sealing elements 7 and 8. Since the first shaft 14 is mounted in a blind bore in the housing, and since fireproof means seals between the second shaft (which is not moved radially) and the housing there should not be any substantial loss of fluid from the passageway in the event of a fire.

Figure 3:
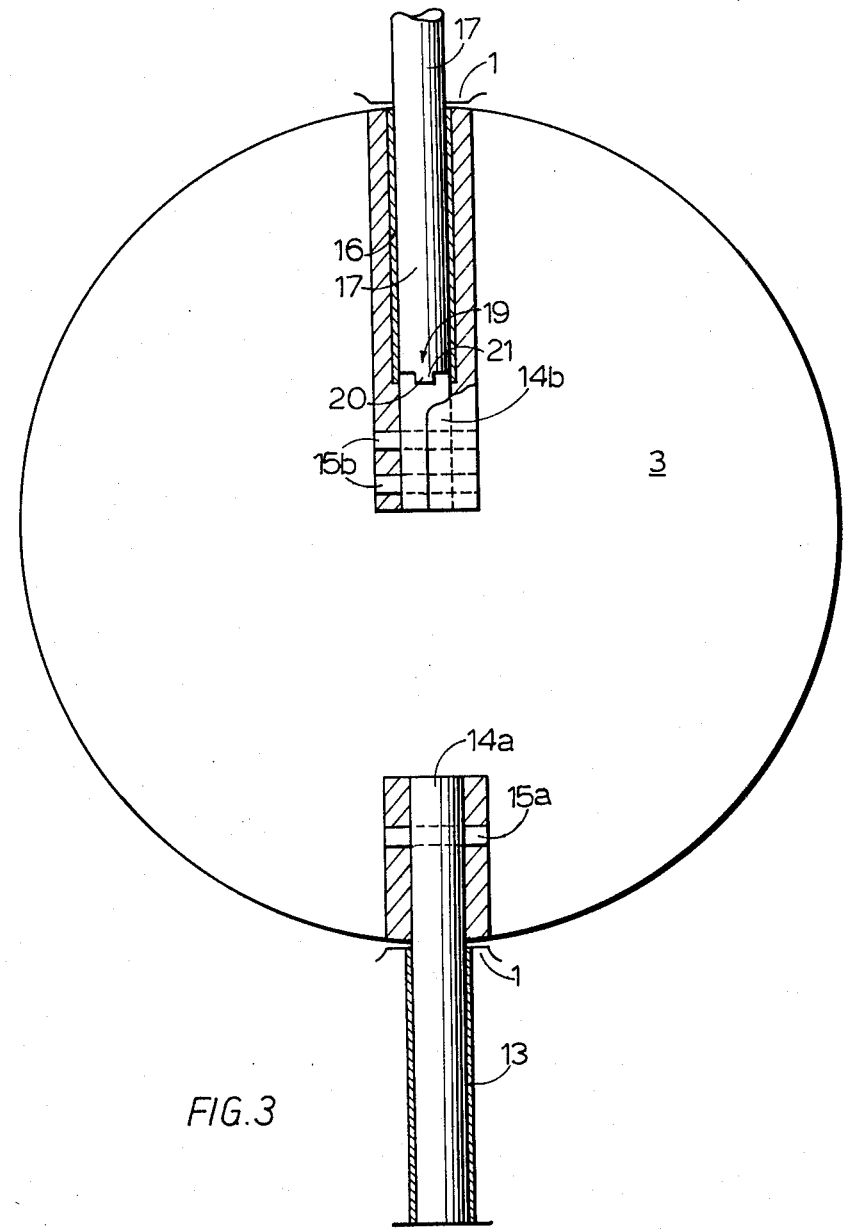
FIG. 3 is a view similar to FIG. 2 but of a modification.

FIG. 3 shows a modified valve in which parts corresponding to those of the valve of FIGS. 1 and 2 have been given corresponding reference numerals. In this construction the single shaft 14 has been replaced by two axially spaced-apart shaft portions 14a and 14b which are respectively secured to the valve disc 3 by dowel pins 15a and 15b respectively. This arrangement of the shafts is preferable to that of FIG. 2 for very large valves where difficulties can arise with long shafts.

Although the shaft portion 14a is shown secured to the disc 3 with the sleeve 13 located radially between the housing 1 and the shaft portion 14a, it would be possible alternatively to secure shaft portion 14a to the housing 1 and arrange the sleeve 13 radially between portion 14a and the disk.

Although metal bands 9 and 10 will usually be required, it may sometimes be possible to dispense with the bands and rely on the inherent resilience of the seals 7 and 8. P.C.T.F.E. seals would then be preferable to P.T.F.E. which is much less resilient. When the bands 9 and 10 are dispensed with it would be preferable for the longer limb of the clamping ring 12 to be extended radially inward to define a support surface adjacent to the unclamped portion of seal 8.

We claim:

1. A butterfly valve comprising a valve housing defining a passageway through which fluid is to pass, a valve (member) disc pivotally mounted in the housing for movement between a closed position, in which it prevents the flow of fluid along the passageway, and an open position in which the flow of fluid is allowed, and an annular seal mounted on the valve housing to seal between a peripheral surface of the valve (member) disc and a wall of the passageway when the valve (member) disc is in its closed position, the seal comprising a primary sealing element and a fireproof ring, and the valve comprising first and second axially aligned shafts mounting the valve disc in the housing, the first shaft (pivotally connecting the valve member to) being mounted in a blind bore in the housing, and the second shaft being mounted for rotation in the housing for actuation of the valve and extending into a bore in the valve disc, connecting means for transmitting rotation of the second shaft to the valve (member) disc but permitting movement of the valve (member) disc radially of the second shaft, and fire-destructible locating means which prevents said radial relative movement and comprises a fire-destructible bearing sleeve (located on the) locating said first shaft in said blind bore and a fire-destructible collar locating said second shaft in said bore in the valve disc, whereby in the event of a fire that destroys the primary sealing element the bearing sleeve and the collar would also be destroyed and the valve (member) disc would become free to move radially relative to its normal pivotal axis and axially of the passageway into sealing engagement with the fire proof ring.

* * * * *